United States Patent
Fay et al.

(10) Patent No.: US 11,780,378 B2
(45) Date of Patent: Oct. 10, 2023

(54) TWEETER FLUSH, SURFACE, AND STARFISH MOUNT INSTALLATION

(71) Applicant: HARMAN INTERNATIONAL INDUSTRIES, INCORPORATED, Stamford, CT (US)

(72) Inventors: Jeffery Fay, Stamford, CT (US); Michael Meng, Shenzen (CN); Christina Wu, Shenzhen (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 219 days.

(21) Appl. No.: 17/136,698

(22) Filed: Dec. 29, 2020

(65) Prior Publication Data

US 2022/0194303 A1 Jun. 23, 2022

(30) Foreign Application Priority Data

Dec. 21, 2020 (CN) .......................... 202011516578.4

(51) Int. Cl.
*B60R 11/02* (2006.01)
*H04R 1/02* (2006.01)

(52) U.S. Cl.
CPC .......... *B60R 11/0217* (2013.01); *H04R 1/025* (2013.01); *H04R 2499/13* (2013.01)

(58) Field of Classification Search
CPC . B60R 11/0217; B60R 11/0223; H04R 1/025; H04R 1/026
USPC ............ 248/222.52, 220.21, 222.11, 222.12, 248/222.51, 223.41, 224.51, 224.8, 27.1, 248/27.3; 381/86, FOR. 124, 385, 389, 381/392

See application file for complete search history.

(56) References Cited

U.S. PATENT DOCUMENTS

| | | | | |
|---|---|---|---|---|
| 4,146,110 A | * | 3/1979 | Maloney | H04R 1/025 381/186 |
| 4,727,587 A | * | 2/1988 | Black | H04R 1/025 174/491 |
| 4,733,748 A | * | 3/1988 | Ponticelli, Jr. | H04R 1/025 381/86 |
| 4,891,842 A | * | 1/1990 | Green | H04R 1/2888 181/150 |
| 5,125,033 A | * | 6/1992 | Lee | H04R 9/066 381/301 |
| 5,231,659 A | * | 7/1993 | Abraham | H04M 1/03 379/433.03 |

(Continued)

*Primary Examiner* — Terrell L McKinnon
*Assistant Examiner* — Michael McDuffie
(74) *Attorney, Agent, or Firm* — Brooks Kushman P.C.

(57) ABSTRACT

A vehicle speaker mount for a speaker includes a central bracket and a plurality of elongated portions extending radially outward from the central bracket. each of the elongated portions includes a respective engagement tab at a distal end of the elongated portion with each engagement tab is configured to be releasably connectable with a base of the speaker. Furthermore, the central bracket defines at least one aperture for receiving hardware to connect the mount to a vehicle surface. The vehicle speaker mount may include a threaded ring member and a base ring for securing the vehicle surface therebetween, or a plurality of flanges extending from a base ring for providing additional mounting surfaces.

9 Claims, 7 Drawing Sheets

(56) References Cited

U.S. PATENT DOCUMENTS

| | | | | |
|---|---|---|---|---|
| 5,867,583 A * | 2/1999 | Hazelwood | ............ | H04R 1/025 381/386 |
| 6,398,179 B1 * | 6/2002 | Soles | .................... | F16F 9/0454 248/617 |
| 6,504,939 B1 * | 1/2003 | Fukuda | .................. | H04R 1/021 381/345 |
| 6,752,366 B2 * | 6/2004 | Chuang | .................. | H04R 1/025 248/220.21 |
| 6,876,753 B2 * | 4/2005 | Kim | ......................... | H04R 1/02 381/361 |
| 6,925,190 B2 * | 8/2005 | Popken | .................. | H04R 1/025 381/186 |
| 6,987,860 B2 * | 1/2006 | Kurihara | ............. | B60R 11/0217 381/189 |
| 7,177,438 B2 * | 2/2007 | Iwaya | ................... | B60R 11/0217 381/302 |
| 8,023,680 B2 * | 9/2011 | Hayasaka | .............. | H04R 1/025 381/387 |
| 8,223,987 B2 * | 7/2012 | Shibata | .................. | H04R 1/021 181/150 |
| 8,256,728 B2 * | 9/2012 | Wright | ................... | H04R 1/025 248/222.51 |
| 8,325,965 B2 * | 12/2012 | Blackmon | .............. | H04R 1/345 381/387 |
| 8,622,590 B2 * | 1/2014 | Cheng | .................... | F21V 17/12 248/222.51 |
| 9,027,892 B2 * | 5/2015 | Boer | ....................... | F16M 13/02 248/222.52 |
| 9,638,313 B2 * | 5/2017 | Steward | .................. | F16H 57/04 |
| 9,877,095 B2 * | 1/2018 | Suzuki | ................... | H04R 1/025 |
| 10,717,394 B2 * | 7/2020 | Baba | ....................... | H04R 1/02 |
| 2003/0019990 A1 * | 1/2003 | Iinuma | ................... | H04R 1/025 248/309.1 |
| 2011/0116213 A1 * | 5/2011 | Tai | ....................... | H05K 7/1489 248/220.21 |
| 2013/0153723 A1 * | 6/2013 | Nichols | .................. | F16M 13/02 248/292.12 |

* cited by examiner

TWEETER FLUSH, SURFACE, AND STARFISH MOUNT INSTALLATION

CROSS-REFERENCE TO RELATED APPLICATIONS

This application claims priority to Chinese Patent Application No. 202011516578.4 filed Dec. 21, 2020, the disclosure of which is hereby incorporated in its entirety by reference herein.

TECHNICAL FIELD

The present application is directed to tweeter installation in vehicles, and more particularly, mounting devices for tweeters.

BACKGROUND

Tweeters are a type of high frequency loudspeaker included in many vehicle audio environments. Tweeters are typically mounted on panels of the vehicle interior via installation kits. In some circumstances, the mounting hardware may be visible from the tweeter front or the mounting hardware may be difficult to install.

SUMMARY

According to one or more embodiments, a vehicle speaker mount for a speaker includes a central bracket and a plurality of elongated portions extending radially outward from the central bracket. each of the elongated portions includes a respective engagement tab at a distal end of the elongated portion with each engagement tab is configured to be releasably connectable with a base of the speaker. Furthermore, the central bracket defines at least one aperture for receiving hardware to connect the mount to a vehicle surface.

According to at least one embodiment, the vehicle speaker mount may further include at least one arc shaped leg extending from at least one of the plurality of elongated portions, with each arc shaped leg having a protrusion at a free distal end of the leg for releasably engaging the base of the speaker. In one or more embodiments, the plurality of elongated portions may include a first pair of elongated portions extending radially opposite one another from the central bracket, and a second pair of elongated portions extending radially opposite one another from the central bracket and substantially perpendicular to the first pair, wherein each of the elongated portions are equidistantly spaced about the central bracket. In further embodiments, a geometry of the first pair may be larger than a geometry of the second pair. In other further embodiments, each elongated portion of the first pair may include a pair of arc shaped legs extending from the elongated portion about the central bracket. In at least one embodiment, the central bracket may define three colinear apertures. Furthermore, each aperture may be defined by a circumferential sloped surface recessing each aperture relative to a surface plane of the central bracket. In certain embodiments, the vehicle speaker mount may further include a flat panel arranged below the central bracket and aligned with the apertures for securing the mount to the surface. In at least one embodiment, each elongated portion includes a vertical leg at the distal end of the elongated portion, the vertical leg having the engagement tab arranged thereon extending toward the center of the central bracket and such that the engagement tab is configured to engage the base of the speaker.

According to one or more embodiments, a vehicle speaker mount for a speaker includes a threaded ring member having a bottom end and a top end, opposite the bottom end, the ring member having a flange edge defined at the top end and extending radially outward from the ring member, and a central bracket at the bottom end and arranged radially inward of the ring member. The central bracket includes a center portion and at least one pair of elongated portions extending radially outwardly and oppositely from the center portion. Each elongated portion includes a distal end connected to a base of the threaded ring member, and a respective engagement tab for engaging a respective recess in a base of the speaker. The vehicle speaker mount further includes an attachment ring having a thread configured to be cooperable with the threaded ring member such that the attachment ring can be secured around the threaded ring member from the bottom end to secure the mount to a surface positioned between the attachment ring and the flange edge. The threaded ring member and central bracket cooperate to define a cavity for receiving the speaker therein. According to at least one embodiment, the threaded ring member and the central bracket may be connected only at the elongated portions such that a bottom surface of the speaker is exposed. In one or more embodiments, the vehicle speaker mount may further include at least one arc shaped leg extending from at least one of the plurality of elongated portions, with each arc shaped leg having a protrusion at a free distal end of the leg for engaging the base of the speaker. In at least one embodiment, each elongated portion may include a vertical leg at the distal end of the elongated portion, the vertical leg having the engagement tab arranged thereon extending toward the center of the central bracket and such that the engagement tab is configured to engage the base of the speaker.

According to one or more embodiments, a vehicle speaker mount for a speaker includes a central bracket having a center portion and at least one pair of elongated portions extending radially outwardly and oppositely from the center portion, with the center portion and elongated portions defining a base plane. Each elongated portion has a distal end including a respective engagement tab for engaging a respective recess in the speaker. The vehicle speaker mount further includes a starfish bracket having a base ring connected to the central bracket at the elongated portions, the base ring having a bottom end positioned along the base plane, and a top end opposite the bottom end at a predefined height above the base plane. The starfish bracket includes a first plurality of flanges extending radially outward from the bottom end and a second plurality of flanges extending radially outward from the top end, with each of the first plurality being offset from the second plurality of flanges around a circumference of the base ring. The starfish bracket and the central bracket are configured to cooperate to define a cavity for receiving the speaker therein.

According to at least one embodiment, the base ring may only include the top end at circumferential portions corresponding to the second plurality of flanges extending from the base ring such that exposed areas form above the first plurality of flanges. In one or more embodiments, the first plurality of flanges may be evenly spaced around the circumference of the base ring at the top end, and the second plurality of flanges may be evenly spaced around the circumference of the base ring at the bottom end. In further embodiments, the first plurality of flanges may include three flanges spaced apart by 120 degrees around the base ring, and the second plurality of flanges may include three flanges spaced apart by 120 degrees around the base ring and each flange of the second plurality may be positioned circumferentially between two flanges of the first plurality. In at least one embodiment, each flange of the second plurality of flanges may include a flat edge connected to the flange by a connecting member extending in the upward direction. In some further embodiments, each flange of the first plurality of flanges may be flat with respect to the base plane. According to at least one embodiment, each elongated portion may include a vertical leg at the distal end of the elongated portion, the vertical leg having the engagement tab arranged thereon extending toward the center of the central bracket and such that the engagement tab is configured to engage the base of the speaker.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

According to one or more embodiments, a mounting bracket for a high-frequency loudspeaker (i.e., a tweeter) is provided. As compared with conventional mounting brackets, the mounts described herein may be more compact and more easily concealed from the front, as well as provide improvements in ease of installation.

Figure 1:
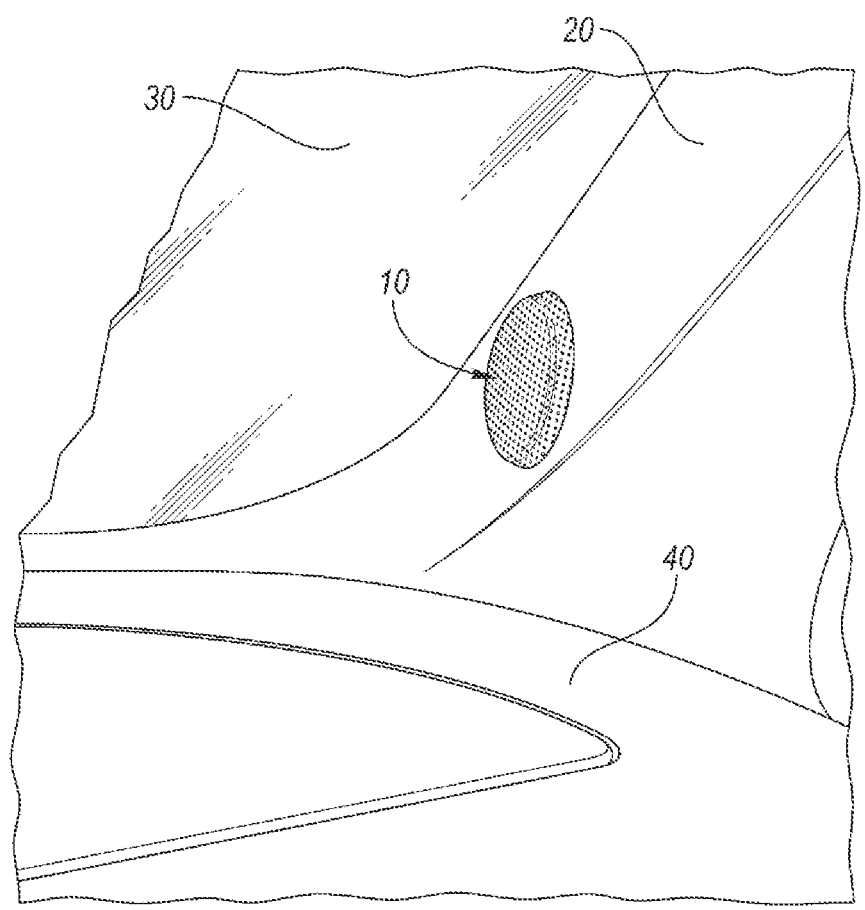
FIG. 1 illustrates a partial perspective view of a vehicle surface having a vehicle speaker mounting assembly thereon, according to one embodiment.

As shown in FIG. 1, an example of a vehicle speaker 10 is shown mounted within a A-pillar decorative interior surface 20 adjacent a windshield 30 and a dashboard panel 40. The speaker 10 is secured behind the A-pillar decorative interior surface 20 such that the mounting hardware is not visible to occupants of the vehicle. In one or more embodiments, the speaker 10 may be mounted to a surface behind the A-pillar decorative surface. In other embodiments, the speaker 10 may be secured to the A-pillar decorative interior surface 20. As such, the speaker 10 has a clean look against the A-pillar decorative interior surface 20. The speaker 10 may be a high frequency loud speaker (i.e., a tweeter) having any suitable shape based on the desired design for the aesthetic of the vehicle sound system. For example, the speaker 10 is shown in the Figures as a circular speaker 10. The mounting hardware for retaining the speaker 10 will be discussed in detail herein.

Figure 2:
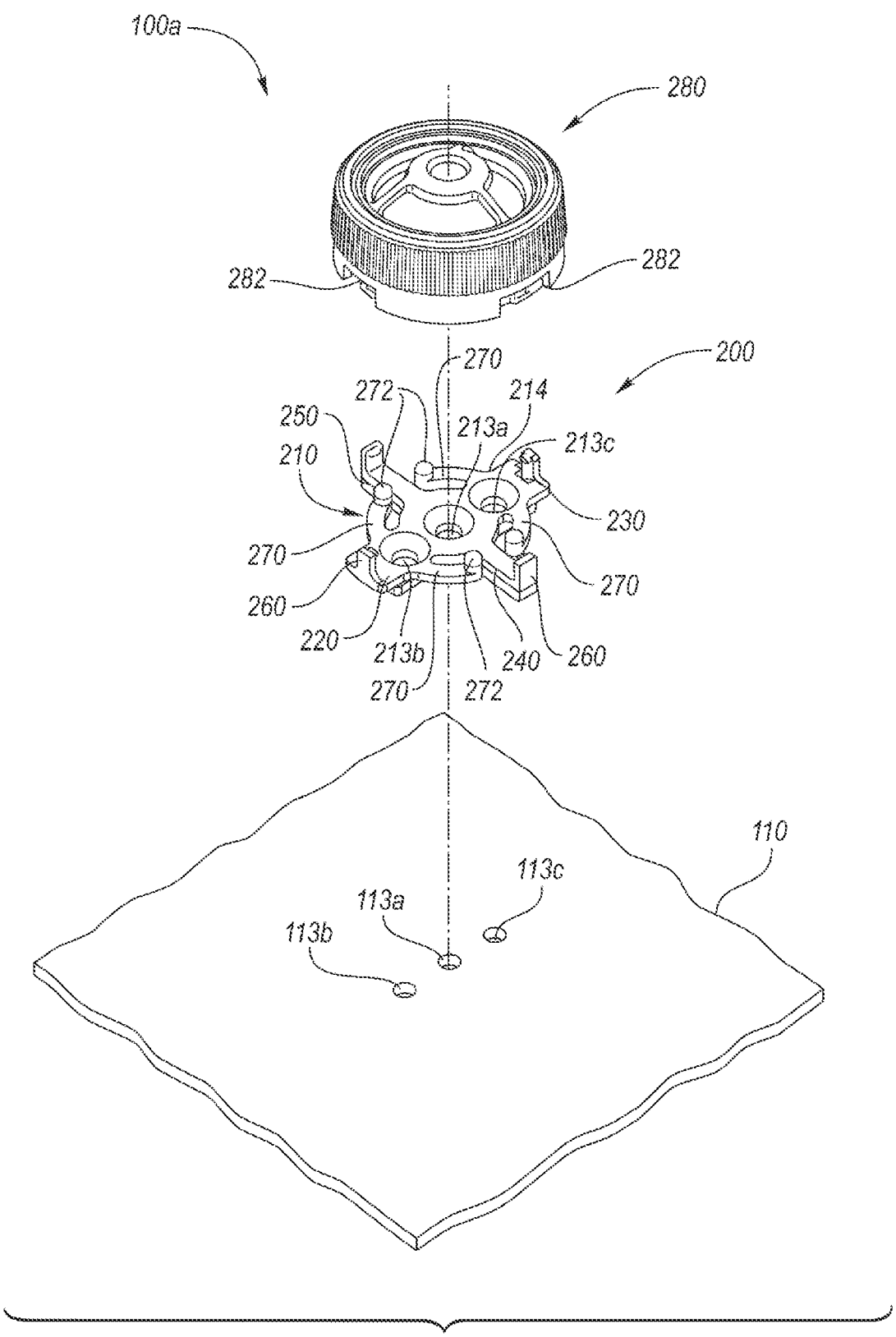
FIG. 2 illustrates an exploded view of a vehicle speaker mounting assembly, according to an embodiment.

Referring to FIG. 2, an example of a vehicle speaker mounting assembly 100a is shown. The vehicle speaker mounting assembly 100a includes a vehicle speaker mount 200 for securing a speaker 280 to a vehicle surface 110. The vehicle surface 110 may be any suitable vehicle surface, such as, but not limited to, a headliner, front panels, pillars, and the like. Specifically, the vehicle surface 110 may be an interior panel of the vehicle such as an interior screen panel, dashboard, door panel, center console, etc. In many cases, these surfaces are exposed and visible to the user and thus aesthetically appealing designs and integration of speaker assemblies 100 are desired. The vehicle speaker assembly 100a may be configured to provide audible noise to passengers and the driver within the vehicle, and may be connected to a vehicle sound system (not shown). The speaker mounting assembly 100a may interface with an audio system of the vehicle to provide audio output therefrom.

Figure 3A:
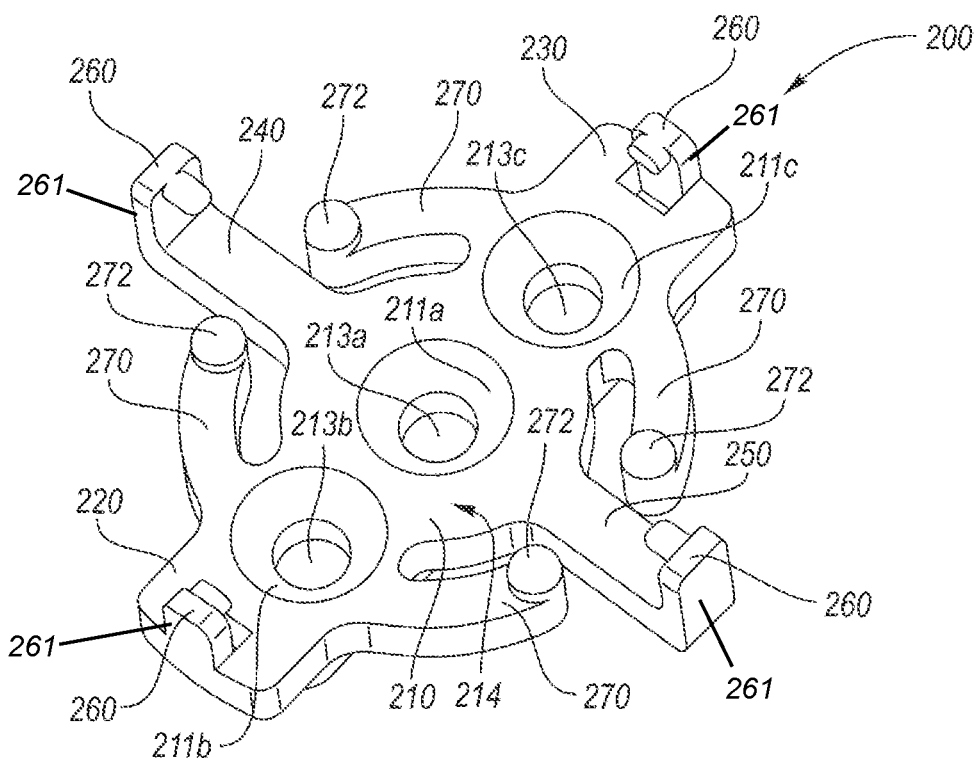
FIG. 3A illustrates a front perspective view of the vehicle speaker mount of the vehicle speaker mounting assembly of FIG. 2.
Figure 3B:
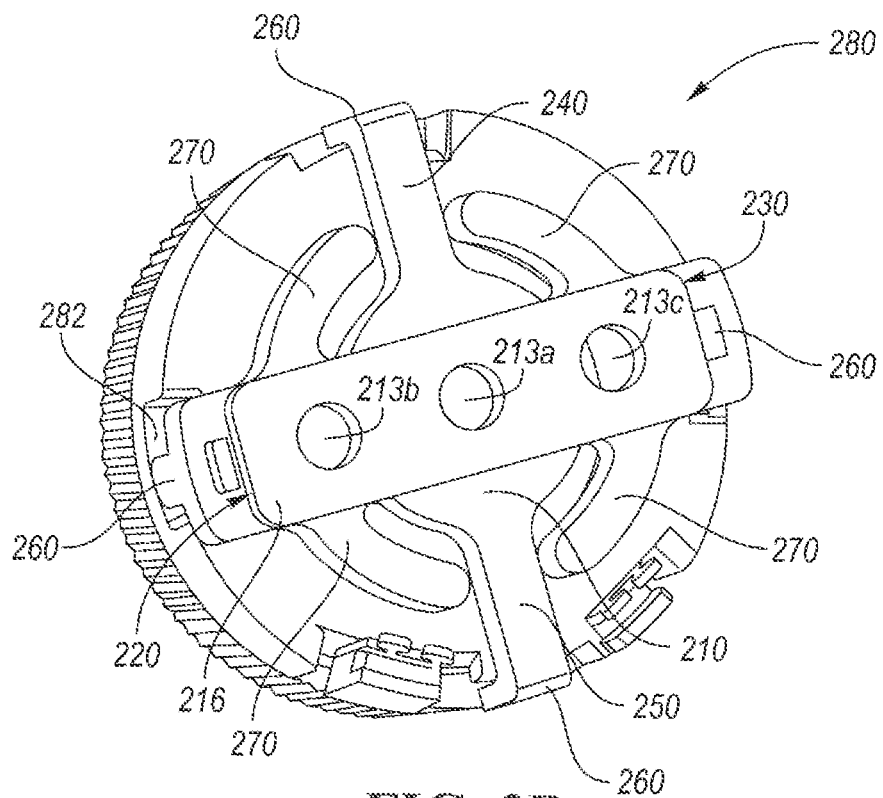
FIG. 3B illustrates a rear perspective view of the vehicle speaker mount of FIG. 3A with a speaker mounted therein.

Referring to FIGS. 2 and 3A-B, the speaker mount 200 may be configured as a surface mount for the speaker 280. As shown in FIG. 2, the mount 200 can be positioned on the surface 110 and mounted thereto via hardware (not shown) such that the mount 200 and speaker 280 are located above the plane of the surface 110. The hardware secures the mount 200 to the surface 100 prior to insertion of the speaker 280 into the mount 200. The mount 200 may be made of any suitable material for retaining the speaker 280 and securing the speaker 280 to the vehicle surface 100, such as, but not limited to, plastic or metal. In some examples the mount 200 may include multiple materials, may be injection molded, welded, stamped, or be produced by any other suitable mechanism. The mount 200 is configured to engage a bottom end of the speaker 280, and define an opening so that the bottom end of the speaker 280 may be exposed in order for the speaker to be connected to the vehicle sound system. Openings at the bottom of the mount 200 may also allow for cooling at the bottom end of the speaker. The mount 200 and its engagement with the speaker 280 and the surface 110 is discussed in more detail below.

As shown in FIG. 2, the speaker mount 200 is configured to receive the speaker 280 thereon to mount it to the vehicle surface 110. The speaker 280 may include components such as a dome (not shown) and a base forming the closed back typical of high frequency speakers. These additional components may be integrally formed with the mount 200 or be separate features. Furthermore, the base of the speaker 280 includes recesses 282 for securing the speaker 280 to the mount 200 such that the vibration of the speaker 280 is limited while the base of the speaker 280 is exposed. The speaker 280 may be exposed for cooling and/or for providing access to features for electrical connections.

Referring again to FIG. 2, as well as the details shown in FIGS. 3A-B, the mount 200 includes a central bracket 210 having a center portion 212. The center portion 212 defines a surface plane on a first side 214 of the central bracket 210. The mount 200 further includes a plurality of elongated portions, including a first elongated portion 220, a second elongated portion 230, a third elongated portion 240, and a fourth elongated portion 250 extending radially outward from the center portion 212. The first and second elongated portions 220 and 230 form a first pair and extend radially opposite one another from the center portion 212. The third and fourth elongated portions 240 and 250 form a second pair and also extend radially opposite one another from the center portion 212. In the example shown in FIGS. 3A-B, the elongated portions 220, 230, 240, 250 are spaced equidistantly about the center portion 212 such that approximately 90 degrees of separation exists between the elongated portions as defined around the center portion 212. In one or more embodiments, the central bracket 210 and the elongated portions 220, 230, 240, 250 are integrally connected, for example, via being formed by injection molded plastic.

As can be seen in FIGS. 3A-B, the elongated portions 220, 230, 240, 250 each include a respective engagement tab 260 at a distal end of the respective elongated portion 220, 230, 240, 250, opposite the center portion 212, for engaging the speaker 280. The elongated portions 220, 230, 240, 250 are dimensioned to secure to the base of the speaker 280 (e.g., based on the diameter of the speaker 280 for the circular speaker example). The engagement tab 260 secures the mount 200 to the speaker 280 via respective recesses 282 in the base of the speaker 280 such that the speaker can be twisted into the mount 200 to engage the engagement tabs 260 within the recesses 282. Although four elongated portions are shown in the Figures, it is contemplated that any suitable number of elongated portions may be included as based on the required engagement tabs for the design of the speaker and the respective recesses within the base of the speaker. In certain embodiments, each engagement tab 260 may be raised with respect to the surface plane. The engagement tabs 260 may be connected to the distal end of the elongated portions 220, 230, 240, 250 by a vertically extending member 261 which extends upward from the surface plane, such that the engagement tabs 260 protrude radially inward from the vertically extending member 261. The speaker 280 may be inserted onto the central bracket 210 with the engagement tabs 260 engaging the recesses 282, and can be twisted thereon to secure the speaker 280 into the mount 200.

In some embodiments, based on the configuration of the central bracket 210, the elongated portions may have different geometries with respect to each other. For example, the first and second elongated portions 220 and 230 may be thinner (i.e., less wide) than the third and fourth elongated portions 240 and 250. At least one of the elongated portions 220, 230, 240, 250 may further include an arc shaped leg 270 extending from the elongated portion (as shown off of elongated portions 220, 230) and within the surface plane of the central bracket 210. In certain embodiments, each elongated portion of a pair, such as elongated portions 220, 230, include a pair of arc shaped legs 270 extending therefrom. The arc shaped legs 270 may extend proximate to the center portion 212 and curve towards the neighboring elongated portion. Each arc shaped leg 270 may include a protrusion 272 at a free end of the arch shaped leg 270, opposite the elongated portion 220, 230, with the protrusion 272 being raised with respect to the surface plane of the central bracket 210. The protrusions 272 may facilitate securing the mount 200 to the speaker 280, and may provide additional stability from vibration without requiring additional connections to the speaker 280.

Referring again to FIGS. 2 and 3A-B, the center portion 212 further defines one or more apertures 213, including a first aperture 213a, second aperture 213b, and third aperture. 213c The apertures 213 may be configured to receive hardware (not shown) to secure the mount 200 to the vehicle surface 110. Although three apertures 213 are shown in FIG. 3A, any suitable number of apertures may be included to secure the mount 200 to the surface 110. In certain embodiments, the apertures 213a, 213b, and 213c may extend colinearly such that they are aligned along the center portion 212 of the central bracket 210. That is, the apertures 213 may be centered along an axis of the central portion 212 along a line with the first aperture 213a defined at the center of the central bracket 210 between the second and third apertures 213b, 213c. In certain embodiments, the apertures 213a, 213b, 213c are defined by respective tapered or sloped surfaces 211a, 211b, 211c extending circumferentially around the apertures 213a, 213b, 213c such that the apertures 213a, 213b, 213c are depressed or recessed with respect to the surface plane.

Referring to FIG. 3B, a rear view of the mount 200 is shown in more detail. The rear side of central bracket 210 includes a flat panel 216 positioned on the rear side of center portion 212. The flat panel 216 may be integrally formed with the center portion 212, such as by injection molding. The flat panel 216 may include a plurality of apertures 216, including a first aperture 216a, second aperture 216b, and third aperture 216c configured to align with the respective apertures 213a, 213b, and 213c of the central bracket 210. The flat panel 216 extends along the direction of the first and second elongated portions 220, 230, and is positioned below the surface plane defined by the center portion 212. The flat panel 216 provides the mount surface which abuts the vehicle surface 110 such that the mount 200 is stable on the vehicle surface 110. Furthermore, as described above and shown in FIG. 2, the vehicle surface 110 may include cavities 113a, 113b, 113c for receiving hardware (not shown) through the apertures 213a, 213b, 213c and flat panel apertures 216a, 216b, and 216c, respectively, to facilitate securing the mount 200 to the vehicle surface 110. In certain embodiments, the mount 200 may be secured to the vehicle surface 110 prior to the speaker 280 being twisted into the mount 200. As such, the mount 200 provides a surface mount for the speaker 280.

Figure 4:
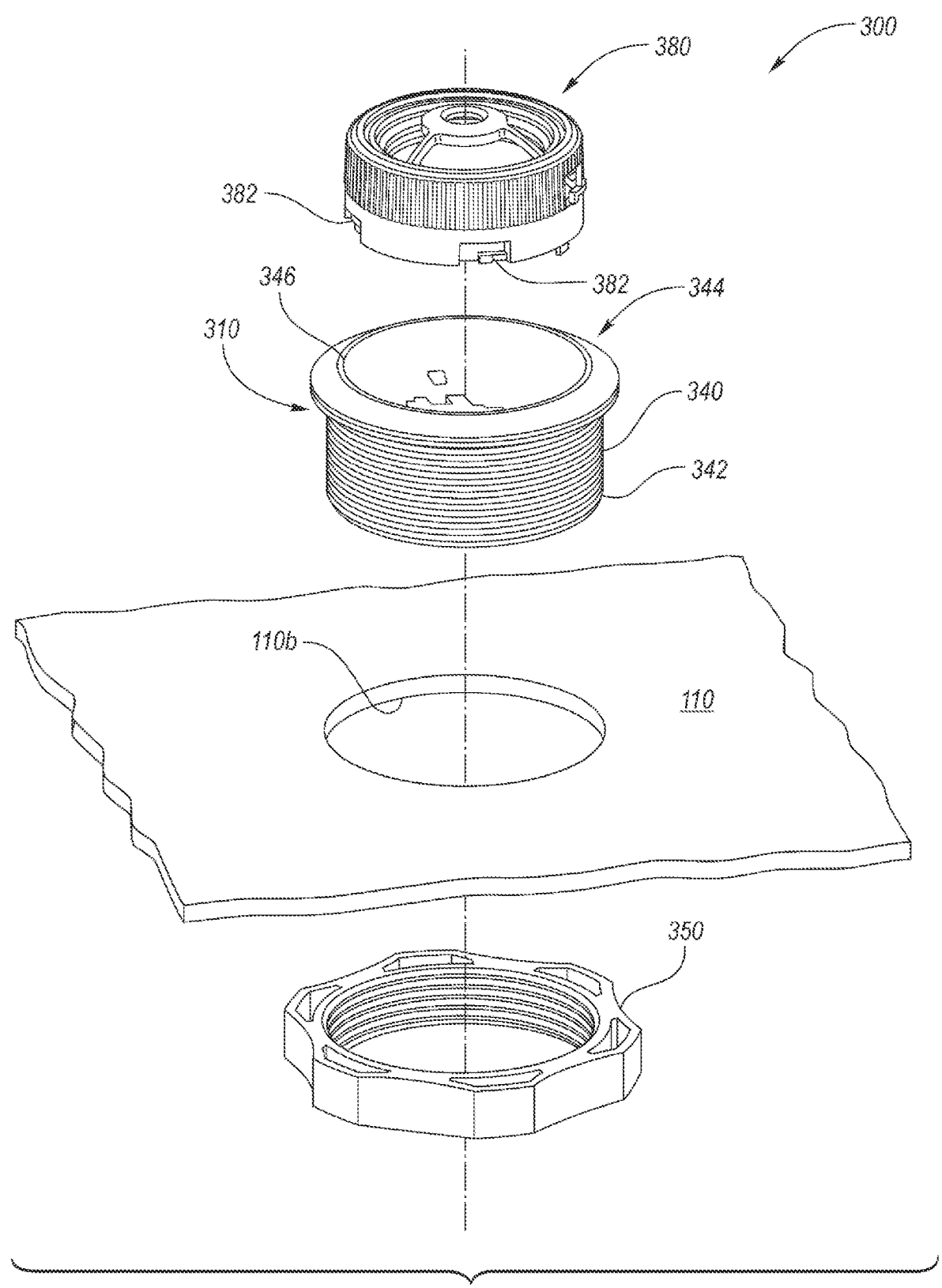
FIG. 4 illustrates an exploded view of a vehicle speaker mounting assembly, according to another embodiment.
Figure 5A:
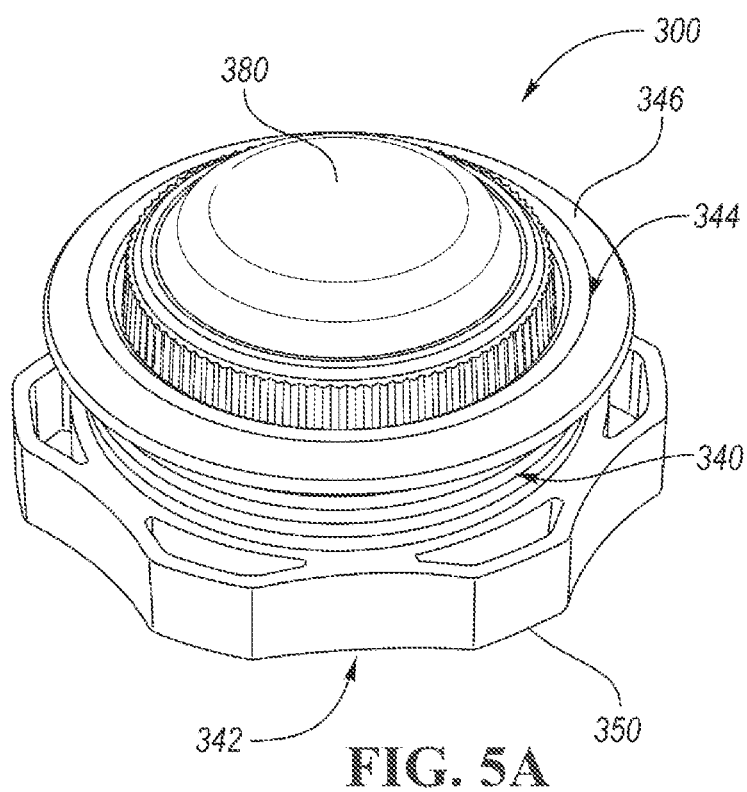
FIG. 5A illustrates a front perspective view of the vehicle speaker mount and speaker of the vehicle speaker mounting assembly of FIG. 4.
Figure 5B:
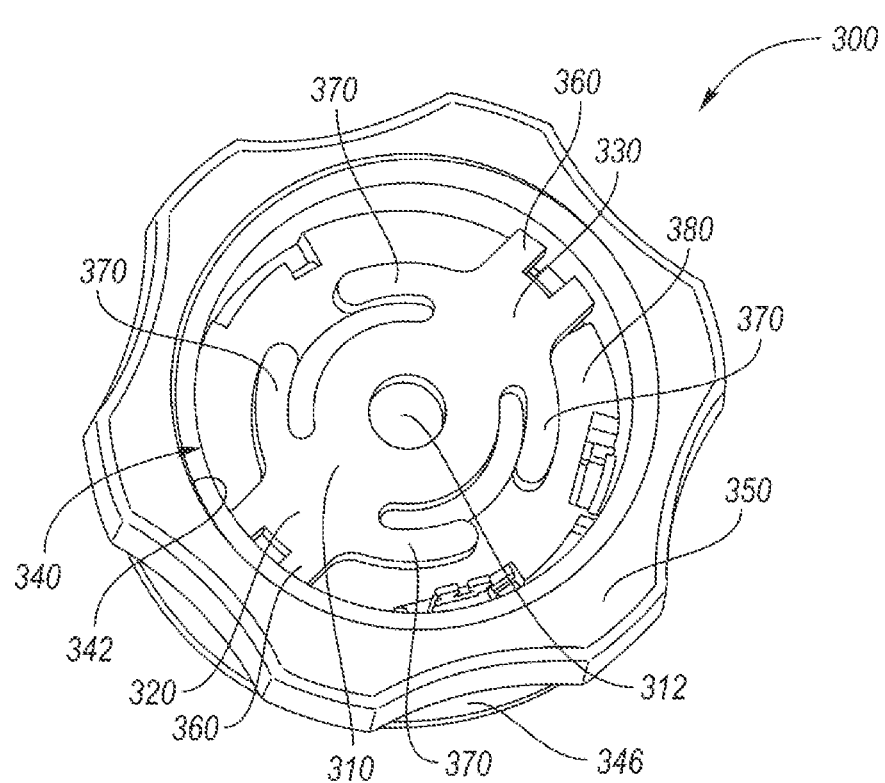
FIG. 5B illustrates a rear perspective view of the vehicle speaker mount and speaker of FIG. 5A.

Referring to FIGS. 4 and 5A-B, another example vehicle speaker mounting assembly 100b is shown. The vehicle speaker mounting assembly 100b includes a vehicle speaker mount 300 for securing a speaker 380 to the vehicle surface 110. The speaker 380 may be a high frequency loud speaker (i.e., a tweeter) having any suitable shape based on the desired design for the aesthetic of the vehicle sound system. For example, speaker 380 is shown in the Figures as a circular speaker 380. The speaker 380 may include components such as a dome (not shown) and a base forming the closed back typical of high frequency speakers. The base of speaker 380 includes recesses 382 for securing the speaker 380 to the mount 300 such that the vibration of the speaker 380 is limited while the base of the speaker 380 is exposed. The speaker 280 may be exposed for cooling and/or for providing access to features for electrical connections. Similar to the examples described with respect to FIGS. 2 and 3A-B, the mount 300 is configured as a flush mount for the speaker 380 such that the vehicle surface 110 includes an aperture 113 for receiving the mount 300 therein, and such that a portion of the mount 300 is rests on the surface 110 about a periphery of the aperture 113 such that the mount 300 can be secured to the surface 110 and the body of the speaker 380 is located in the mount 300 below the surface 110 and a top part of the speaker 380 is exposed. The mount 300 includes features to secure the mount 300 to the surface 110 prior to insertion of the speaker 380 into a well, defined by the mount 300, however, in certain embodiments, the speaker 380 may be twisted into the mount 300 prior to the mount 300 being secured to the surface 110. As previously discussed, the vehicle surface 110 may be any suitable vehicle surface, such as, but not limited to, a headliner, front panels, pillars, and the like, and may include features for electrically connecting the speaker 380 to the vehicle sound system (not shown). The mount 300 engages the bottom end of the speaker 380, and exposes the bottom end of the speaker 380 such that the speaker can be connected to the vehicle sound system and/or for cooling the bottom end of the speaker. The mount 300 and its engagement with the speaker 380 and the surface 110 will be discussed in more detail below.

Referring again to FIGS. 5A-5B, the vehicle speaker mount 300 includes a central bracket 310 having a center portion 312. The center portion 312 defines a base plane for the mount 300. The center portion 312 further defines an aperture 313 therein for receiving hardware (not shown). Although only one aperture is shown in FIG. 4A, it is contemplated that any suitable number of apertures can be included. The aperture 313 may be defined at a center of the central bracket 310, and, in certain embodiments, may be defined by a sloped or tapered surface (not shown) in the central portion 312 extending circumferentially around the aperture 313 such that the aperture 313 is depressed compared to the base plane. The mount 300 may be secured to the vehicle surface 110 via the central bracket 310 (similar to FIG. 2), or can be flush mounted to the vehicle surface 110 as shown in FIG. 4 via features that will be discussed in further detail below.

The mount 300 further includes a plurality of elongated portions, including first elongated portion 320 and second elongated portion 330, extending radially outward from the center portion 312. First and second elongated portions 320 and 330 form a pair positioned and extending radially opposite one another from the center portion 312. At least one of the elongated portions 320,330 may further include an arc shaped leg 370 extending from the elongated portion (as shown off of elongated portions 320, 330) and within the base plane of the central bracket 310. In certain embodiments, each elongated portion of a pair, such as elongated portions 320, 330, include a pair of arc shaped legs 370 extending therefrom. The arc shaped legs 370 may extend proximate to the center portion 312 and curve towards the neighboring elongated portion. Each arc shaped leg 370 may include a protrusion 372 at a free distal end of the arch shaped leg 370, opposite the elongated portion 320, 330, with the protrusion 372 being raised with respect to the base plane of the central bracket 310. The protrusions 372 may facilitate securing the mount 300 to the speaker 380, and may provide additional stability from vibration without requiring additional connections to the speaker 380. In one or more embodiments, the central bracket 310 and the elongated portions 320, 330 are integrally connected, for example, via being formed by injection molded plastic.

As can be seen in FIGS. 5A-B, the elongated portions 320, 330 each include a respective engagement tab 360 at a distal end of the respective elongated portion 320, 330 opposite the center portion 312. Engagement tab 360 secures the mount 300 to the speaker 380 via respective recesses 382 in the base of the speaker 380 such that the speaker can be twisted into the mount 300 to engage the engagement tabs 360 within the recesses 382. Although two elongated portions are shown in the Figures, it is contemplated that any suitable number of elongated portions may be included as based on the required engagement tabs for the design of the speaker and the respective recesses within the base of the speaker. In certain embodiments, each engagement tab 360 is raised with respect to the base plane. The engagement tabs 360 may be connected to the distal end of the elongated portions 320, 330 by a vertically extending member or leg 361 which extends upward from the base plane, such that the engagement tabs 360 protrude radially inward from the vertically extending member 361. The speaker 380 can be inserted into the well of the central bracket 310 with the engagement tabs 360 engaging the recesses 382, and can be twisted thereon to secure the speaker 380 into the mount 300.

Referring again to FIG. 4 and FIGS. 5A-B, the mount 300 further includes a threaded ring member 340 cooperating with the central bracket 310 to form the well for receiving the speaker 380. The threaded ring member 340 may be integrally formed with the central bracket 310 via any suitable process, such as, but not limited to, injection molding or welding. The threaded ring member 340 extends vertically upward from the base plane, from a bottom end 342 at the base plane to a top end 344, defining a height therebetween. The bottom end 342 of the threaded ring member 340 surrounds the central bracket 310 to form a periphery of the threaded ring member 340 that extends over the height. The threaded ring member 340 is connected to the central bracket 310 at the distal ends of the elongated portions 320, 330 at the bottom end 342 of the threaded ring member 340. The engagement tabs 360 protrude inward from the periphery formed by the threaded ring member 340 to engage the recesses 382 in the speaker 380. The threaded ring member 340 and central bracket 310 cooperate to form the well for receiving the speaker 380, such that the speaker 380 is supported within the well and the bottom of the speaker 380 is partially exposed (around the features of the central bracket 310) to allow for electrical connections and cooling, while maintaining a stable base for the mount 300.

Referring again to FIG. 4 and FIG. 5A, a flange edge lip 346 extends radially outward from the top end 344 of the threaded ring member 340 providing an edge surface that can provide the flush contact with the vehicle surface 110. Although the flange edge lip 346 is shown as circular, the flange lip 346 may extend from the top end 344 of the threaded ring member 340 in any suitable shape or pattern as based on the desired design of the flush mount 300, and extend farther such that the radius of the flange lip 346 is greater than a radius of the aperture 110b in the vehicle surface 110. The mount 300 further includes an attachment ring 350 which is configured to cooperate with the threaded ring member 340 to secure the vehicle surface 110 between the attachment ring 350 and the flange lip 346 such that the flange lip 346 forms a flush surface with the vehicle surface 110 when the mount 300 is secured in this position. The threaded ring member 340 includes helical threading over the height for converting rotational movement of the attachment ring 350 to linear vertical movement. The attachment ring 350 is sized and shaped to surround and be concentric with the threaded ring member 340 and includes grooves along the inner periphery to engage the helical threading such that the attachment ring 350 can be rotated about the threaded ring member 340 to be positioned below the flange lip 346, with the surface 110 therebetween. As such, the mount 300 can be secured to the vehicle surface 110 between the flange lip 346 and attachment ring 350 or to the vehicle surface 110 via the central bracket 310, depending on the desired design and space provided in the vehicle. Although the dimensions are shown as circular in the examples, it is contemplated that the speaker 380 shape and attachment ring 350 may be shaped to cooperate based on the desired design. As such, the mount 300 provides a flush mount for the speaker 380.

Figure 6:
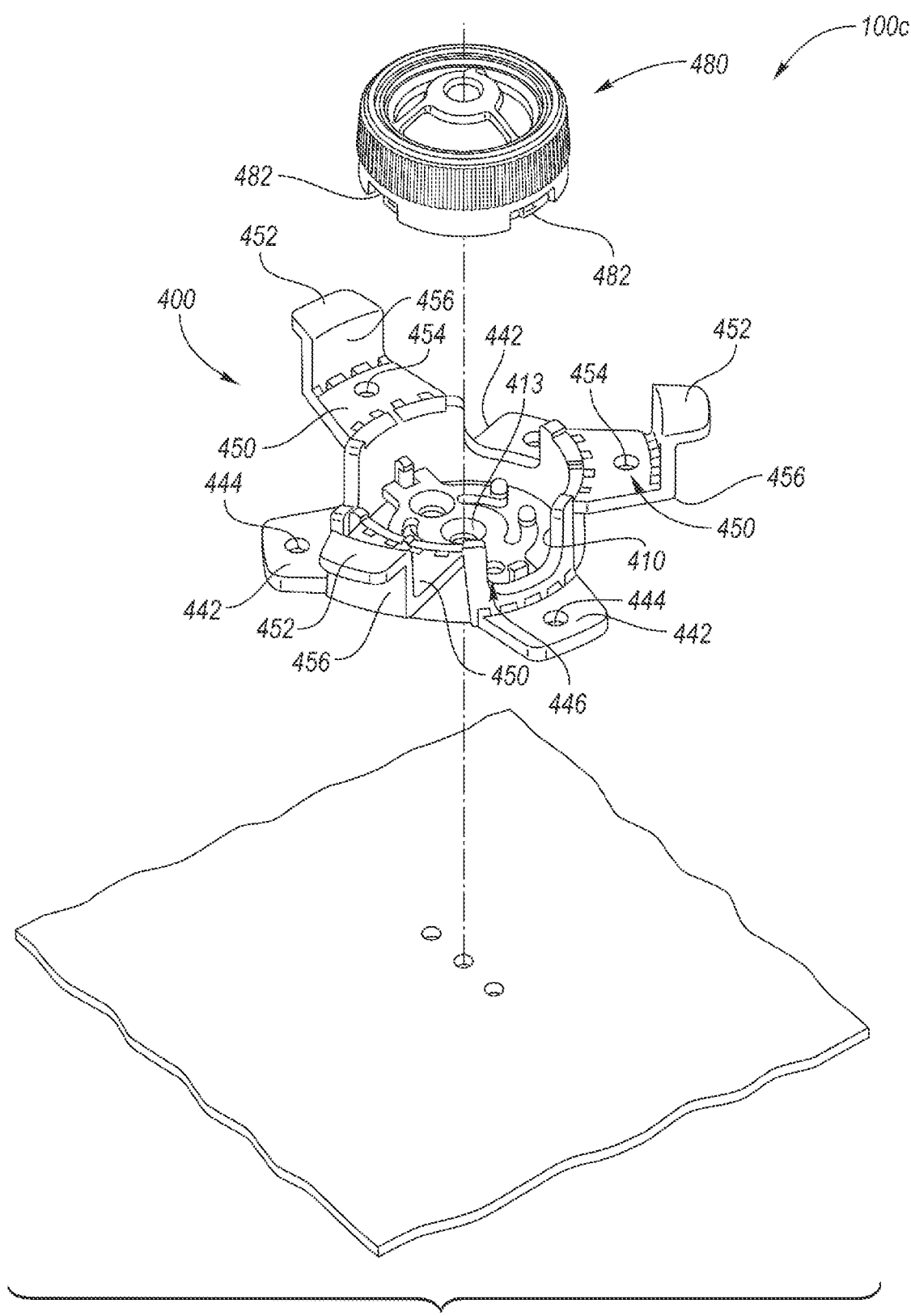
FIG. 6 illustrates an exploded view of a vehicle speaker mounting assembly, according to yet another embodiment.
Figure 7A:
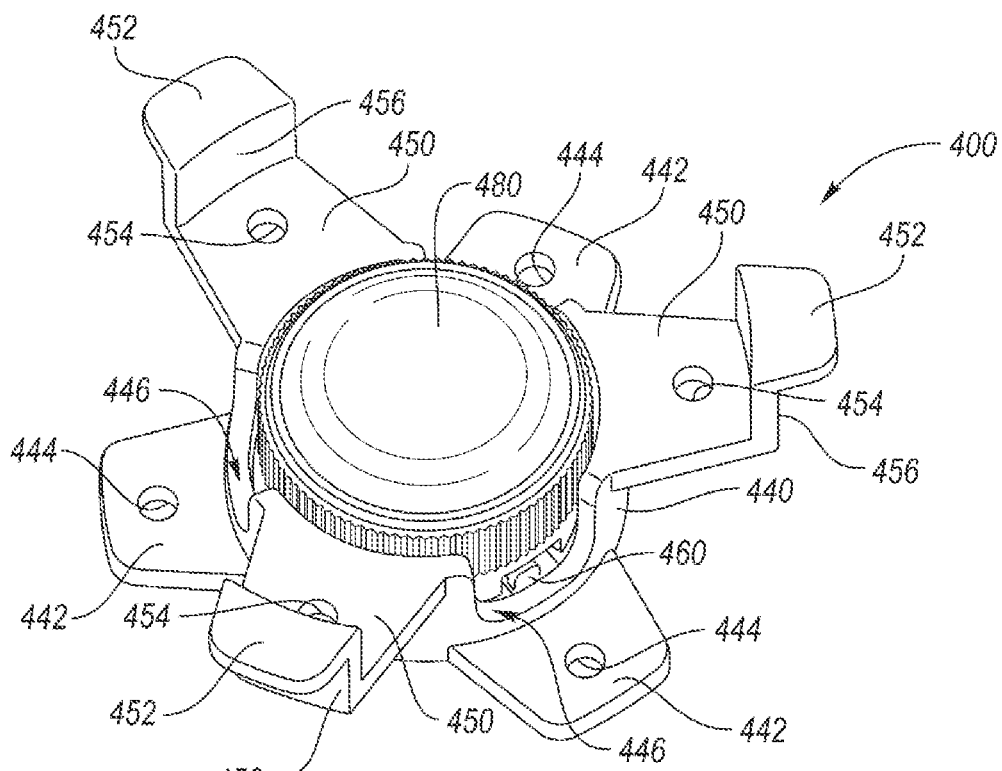
FIG. 7A illustrates a front perspective view of the vehicle speaker mount and speaker of the vehicle speaker mounting assembly of FIG. 6.
Figure 7B:
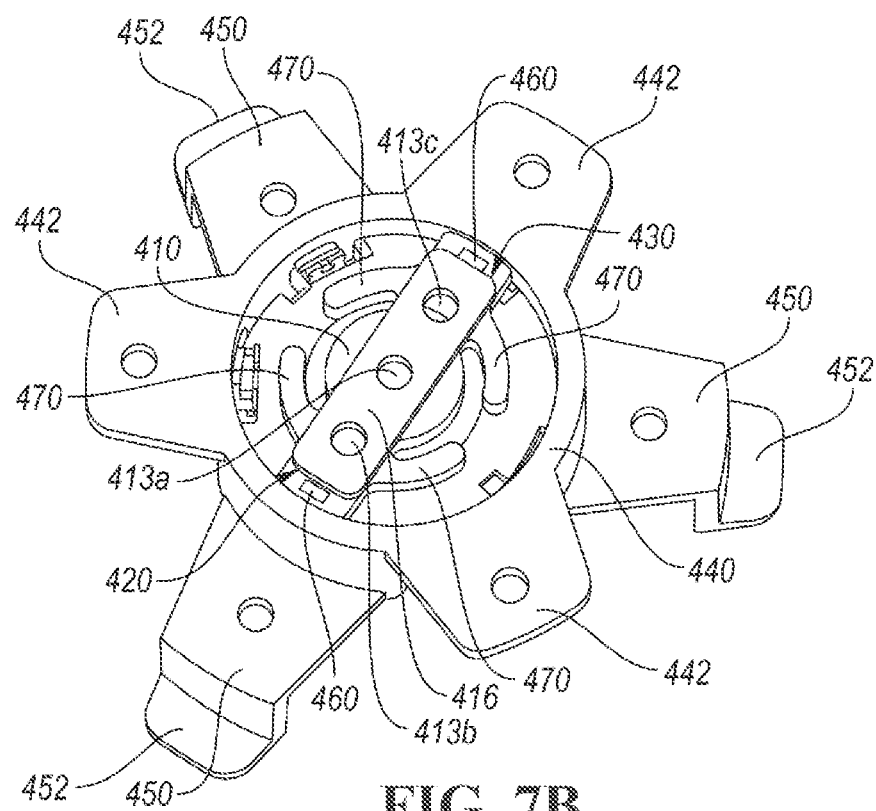
FIG. 7B illustrates a rear perspective view of the vehicle speaker mount and speaker of FIG. 7A.

Referring to FIGS. 6 and 7A-B, an example of another vehicle speaker mounting assembly 100c is shown. The vehicle speaker mounting assembly 100c includes a vehicle speaker mount 400 for securing a speaker 480 to a vehicle surface 110. The speaker 480 may be a high frequency loud speaker (i.e., a tweeter) having any suitable shape based on the desired design for the aesthetic of the vehicle sound system. For example, speaker 480 is shown in the Figures as a circular speaker 480. The speaker 480 may include components such as a dome (not shown) and a base forming the closed back typical of high frequency speakers. The base of speaker 480 includes recesses 482 for securing the speaker 480 to the mount 400 such that the vibration of the speaker 480 is limited while the base of the speaker 480 is exposed. The speaker 480 may be exposed for cooling and/or for providing access to features for electrical connections. Similar to the previous examples, the mount 400 is configured as a starfish mount for the speaker 480 such that such that the mount 400 can be positioned on the surface 110 and mounted thereto via hardware (not shown) such that the mount 400 and speaker 480 are located above the plane of the surface 110, with flanges 442, 450 provided to contact additional mounting surfaces. Thus, although shown as secured on the surface 110, the mount 400 may be secured using the surfaces of the flanges 442, 450 and providing hardware through the apertures 444, 454 in instances where, for example, the mounting surface 110 is not flat such that the bottom of the mount 400 does not lay flush, and, as such, the depiction of mounting to the surface 110 is not intended to be limiting. Furthermore, one or more of the flanges 442, 450 may be removable from the mount 400 based on the space available for securing the mount 400. In one or more embodiments, the features of the mount 400 are integrally connected, for example, via being formed by injection molded plastic. In the embodiment shown in FIG. 6 and FIGS. 7A-B, the hardware may secure the mount 400 to the surface 110 prior to insertion of the speaker 480 into the mount 400. The mount 400 may be configured to engage the bottom end of the speaker 480, and exposes the bottom end of the speaker 480 such that the speaker can be connected to the vehicle sound system and/or for cooling the bottom end of the speaker. The starfish mount 400 and its engagement with the speaker 480 and the surface 110 will be discussed in more detail below.

Referring to FIGS. 7A-B, the vehicle speaker mount 400 is shown in more detail. The mount 400 includes a central bracket 410 having a center portion 412. The center portion 412 defines a base plane on a first side 414 of the central bracket 410. The mount 400 further includes elongated portions 420, 430 extending radially outward from the center portion 412. Elongated portions 420 and 430 form a pair and extend radially opposite one another from the center portion 412. At least one of the elongated portions 420, 430 may further include an arc shaped leg 470 extending from the elongated portion (as shown off of elongated portions 420, 430) and within the base plane of the central bracket 410. In certain embodiments, each elongated portion of a pair, such as elongated portions 420, 430, include a pair of arc shaped legs 470 extending therefrom. The arc shaped legs 470 may extend proximate to the center portion 412 and curve towards the neighboring elongated portion. Each arc shaped leg 470 may include a protrusion 472 at a free distal end of the arch shaped leg 470, opposite the elongated portion 420, 430, with the protrusion 472 being raised with respect to the base plane of the central bracket 410. The features of the mount 400, such as the elongated portions 420, 430, arc shaped legs 470, and protrusions 472 may be integrally formed via injection molding to form one unitary structure for the mount. The protrusions 472 may facilitate securing the mount 400 to the speaker 480, and may provide additional stability from vibration without requiring additional connections to the speaker 480.

As can be seen in FIGS. 7A-B, the elongated portions 420, 430 each include a respective engagement tab 460 at a distal end of the respective elongated portion 420, 430 opposite the center portion 412. Engagement tab 460 secures the mount 400 to the speaker 480 via respective recesses 482 in the base of the speaker 480 such that the speaker can be twisted into the mount 400 to engage the engagement tabs 460 within the recesses 482. In certain embodiments, each engagement tab 460 is raised with respect to the base plane. The engagement tabs 460 may be connected to the distal end of the elongated portions 420, 430 by a vertically extending member 461 which extends upward from the base plane, such that the engagement tabs 460 protrude radially inward from the vertically extending member 461. The speaker 480 can be inserted onto the central bracket 410 with the engagement tabs 460 engaging the recesses 482, and can be twisted thereon to secure the speaker 480 into the mount 400.

The center portion 412 further defines one or more apertures 413a, 413b, 413c therein for receiving hardware (not shown) to secure the mount 400 to the vehicle surface 110, as is shown in FIG. 6. Although three apertures are shown in FIG. 6A, any suitable number of apertures may be included to secure the mount 400 to the surface 110. In certain embodiments, the apertures 413a, 413b, and 413c may extend colinearly such that they are aligned along the center portion 412 of the central bracket 410. At least one aperture, shown as aperture 413a in FIGS. 7A-B, may be located at a center of the central bracket 410. In certain embodiments, the apertures 413a, 413b, 413c are defined by respective sloped surfaces 411a, 411b, 411c in the center portion 412 extending circumferentially around the apertures 413a, 413b, 413c such that the apertures 413a, 413b, 413c are depressed compared to the base plane.

Referring to FIG. 7B, a rear view of the mount 400 is shown in more detail. The rear side of central bracket 410 includes a flat panel 416 positioned on the rear side of center portion 412 such that the apertures 413a, 413b, 413c are aligned with apertures 416a, 416b, and 416c of the flat panel 416. The flat panel 416 extends along the direction of the elongated portions 420, 430, and is positioned below the base plane defined by the center portion 412. The flat panel 416 provides the mount surface which abuts the vehicle surface 110 such that the mount 400 is stable on the vehicle surface 110. As such, the flat panel 416 provides one possible mounting surface for the mount 400. Furthermore, the vehicle surface 110 may include cavities 413a, 413b, 413c for receiving hardware (not shown) through the apertures 413a, 413b, 413c and flat panel apertures 416a, 416b, and 416c, respectively, to facilitate securing the mount 400 to the vehicle surface 110. In certain embodiments, the mount 400 may be secured to the vehicle surface 110 prior to the speaker 480 being twisted into the mount 400.

Referring again to FIG. 6 and FIGS. 7A-B, the starfish mount 400 further includes a base ring 440 surrounding the central bracket 410, and connected to the central bracket 410 at the distal ends of the elongated portions 420, 430. The base ring member 440 cooperates with the central bracket 410 to form the well for receiving the speaker 480. The base ring member 440 extends vertically upward from the base plane, from a bottom end 441 at the base plane to a top end 443, defining a height therebetween. The base ring member 440 is connected to the central bracket 410 via the elongated portions 420, 430 at the bottom end 441 of the base ring member 440. Engagement tabs 460 protrude inward from the periphery formed by the base ring member 440 to engage the recesses 482 in the speaker 480. The features of the starfish mount 400, such as the base ring member 440, the central bracket 410, the elongated portions 420, 430, and the like may be integrally formed via injection molding plastic such that the mount 400 is a unitary piece. The base ring member 440 and central bracket 410 cooperate to form the well for receiving the speaker 480, such that the speaker 480 is supported within the well and the bottom of the speaker 480 is partially exposed (around the features of the central bracket 410) to allow for electrical connections and cooling, while maintaining a stable base for the mount 400.

The base ring member 440 includes a first plurality of flanges 442 extending radially outward from the periphery of the base ring member 440 at the bottom end 441. The first plurality of flanges 442 may be substantially aligned within the base plane of the center portion 412, as further aligned with the bottom end 441 of the base ring member 440. The base ring member 440 further includes a second plurality of flanges 450 extending radially outward from the periphery of the base ring member 440 at the top end 443. Although a set of three flanges forms the first plurality of flanges 442 and a set of three flanges forms the second plurality of flanges 450 in the embodiment shown in FIGS. 6 and 7A-B, any number or combination of flanges 442, 450 is contemplated, as will be discussed in further detail below. Flanges 450 include a flat edge 452 connected to flange 450 by a vertically extending connection member 454, with flat edge 452 extending radially outward from the center of the mount 400. Each flange of the first plurality of flanges 442 and second plurality of flanges 450 include a respective aperture 444, 454 for receiving hardware to connect the mount to additional vehicle mounting surfaces, for example, where the central bracket 410 does not lay flush against the mounting surface 110. As such, the flanges 442, 450 provide additional mounting surfaces for the mount 400. For example, flanges 442 may be secured via apertures 444 to a different vehicle surface, or flanges 450 may be secured via apertures 454 to yet another vehicle surface, as based on the location where the speaker 480 is desired. Base ring member 440 includes exposed areas 446 defined around the periphery of the base ring member 440, between flanges 450 of the second plurality of flanges, and vertically above each flange 442 of the first plurality. As such, base ring member 440 includes a height to the top end 443 only where a flange 450 of the second plurality is located. The exposed areas 446 allow for the periphery of the speaker 480 to be seen (as shown in FIG. 7A), and for the engagement tab 460 to be visible for insertion of the speaker 480. In certain embodiments, the exposed areas 446 are provided such that the engagement tabs 460 protrude inward and form at least a portion of the bottom of the exposed areas 446, such that the vertically extending member 461 defines the height of the base ring member 440 at the portions of the periphery with the flanges 442. Furthermore, the flanges 442, 452 can be removed from the base ring member 440 at the connection area to the base ring member 440 in instances where space is limited in the vehicle mounting space. For example, one or more flanges of the first and second plurality of flanges 442, 450 can be broken off when the speaker is mounted at the central bracket 410, such as one or more of the flanges 442, or one or more of the flanges 450, or a combination of flanges 442, 450. Thus, although the mount 400 may be integrally formed via injection molding, the flanges 442, 452 may be removable such that the central bracket 410 and base ring member 440 to form the mount 400 with any number or no flanges 442, 452. As such, the mount 400 includes less material, allows for multiple mounting options via the additional surfaces for mounting, facilitates securing the speaker 480 in the well, and exposes the speaker 480 at various locations throughout the periphery.

The flanges 442 of the first plurality may be, in some embodiments, evenly spaced about the periphery of the base ring member 440, or in other embodiments, unevenly spaced about the periphery of the base ring member 440. In the embodiments shown in FIG. 6 and FIGS. 7A-B, the base ring member 440 includes three flanges 442 extending from the periphery of the base ring member 440 at the bottom end 441, with each flange 442 being evenly spaced (i.e., about 120 degrees apart) with respect to the center point of aperture 413a. Although three flanges 442 are shown in the Figures, any suitable number of flanges is contemplated by the present disclosure, and the description of three flanges is not intended to be limiting. For example, there may be sets of two or more flanges in each of the first and second pluralities of flanges 442, 450. In other examples (not shown), one plurality of flanges may have more flanges than the other plurality of flanges. The flanges 450 of the second plurality may be, in some embodiments, evenly spaced about the periphery of the base ring member 440, or in other embodiments, unevenly spaced about the periphery of the base ring member 440. Furthermore, although not shown in the Figures, the flanges 450 of the second plurality may be positioned at varying heights along the height of the base ring member 440. In the examples shown in FIG. 6 and FIGS. 7A-B, the base ring member 440 includes three flanges 450 extending from the periphery of the base ring member 440 at the top end 443, with each flange 450 being evenly spaced (i.e., about 120 degrees apart) with respect to the center point of aperture 413a, and with exposed areas 446 positioned between two respective flanges 450. Although three flanges 450 are shown in the Figures, any suitable number of flanges is contemplated by the present disclosure, and the description of three flanges is not intended to be limiting. Flanges 450 may be offset from flanges 442 such that the flanges do not overlap in the vertical direction. For example, the staggering of the flanges 442 and flanges 450 result in each flange 442 of the first plurality being spaced 60 degrees from a flange 450 of the second plurality when each plurality includes three flanges. The offset degrees about the periphery may vary based on the number of flanges provided, and the depicted example is not intended to be limiting. As such, a starfish mount 400 for securing a speaker 480 to a vehicle surface 110 is provided.

Thus, a vehicle speaker mounting assembly includes a mount having a central bracket for retaining a speaker thereon is provided. The mount includes engagement tabs for engaging respective recesses in the speaker. According to various embodiments, the mount includes features for securing the speaker based on the desired design configuration, such as a surface mount, a flush mount, or a starfish mount. The features and the central bracket to cooperate to provide form a well for the speaker, and provide a compact design for mounting the speaker that can provide a stable and secure connection to the vehicle surface, with easy insertion of the speaker into the mount.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle speaker mount for a speaker, comprising:
a central bracket; and
a plurality of elongated portions extending radially outward from the central bracket, each of the elongated portions having a respective engagement tab at a distal end of the elongated portion, each elongated portion including a vertically extending member at the distal end of the elongated portion, the vertically extending member having the engagement tab arranged thereon extending toward the center of the central bracket and such that the engagement tab is configured to engage the base of the speaker,
wherein the central bracket defines at least one aperture for receiving hardware to connect the mount to a vehicle surface, and each engagement tab is configured to be releasably connectable with a base of the speaker.

2. The vehicle speaker mount of claim 1, further comprising at least one arc shaped leg extending from at least one of the plurality of elongated portions, each arc shaped leg having a protrusion at a free distal end of the leg for releasably engaging the base of the speaker.

3. The vehicle speaker mount of claim 1, wherein the plurality of elongated portions includes a first pair of elongated portions extending radially opposite one another from the central bracket, and a second pair of elongated portions extending radially opposite one another from the central bracket and substantially perpendicular to the first pair, wherein each of the elongated portions are equidistantly spaced about the central bracket.

4. The vehicle speaker mount of claim 3, wherein a geometry of the first pair is larger than a geometry of the second pair.

5. The vehicle speaker mount of claim 3, wherein each elongated portion of the first pair includes a pair of arc shaped legs extending from the elongated portion about the central bracket.

6. The vehicle speaker mount of claim 1, wherein the central bracket defines three colinear apertures.

7. The vehicle speaker mount of claim 6, wherein each aperture is defined by a circumferential sloped surface recessing each aperture relative to a surface plane of the central bracket.

8. The vehicle speaker mount of claim 6, further comprising a flat panel arranged below the central bracket and aligned with the apertures for securing the mount to the surface.

9. A vehicle speaker mount for a speaker, comprising:
a central bracket; and
a plurality of elongated portions extending radially outward from the central bracket, each of the elongated portions having a respective engagement tab at a distal end of the elongated portion, the plurality of elongated portions including a first pair of elongated portions extending radially opposite one another from the central bracket, and a second pair of elongated portions extending radially opposite one another from the central bracket and substantially perpendicular to the first pair, with each of the elongated portions equidistantly spaced about the central bracket and a geometry of the first pair is larger than a geometry of the second pair,
wherein the central bracket defines at least one aperture for receiving hardware to connect the mount to a vehicle surface, and each engagement tab is configured to be releasably connectable with a base of the speaker.

* * * * *